US009863972B2

(12) United States Patent
Shindo et al.

(10) Patent No.: US 9,863,972 B2
(45) Date of Patent: Jan. 9, 2018

(54) PHYSICAL QUANTITY SENSOR, ELECTRONIC DEVICE, AND MOVING OBJECT

(71) Applicant: Seiko Epson Corporation, Tokyo (JP)

(72) Inventors: Takehiko Shindo, Ina (JP); Masahiro Oshio, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/225,818

(22) Filed: Mar. 26, 2014

(65) Prior Publication Data

US 2014/0290363 A1  Oct. 2, 2014

(30) Foreign Application Priority Data

Mar. 28, 2013  (JP) ................................ 2013-068919

(51) Int. Cl.
| | |
|---|---|
| G01P 15/00 | (2006.01) |
| G01P 3/14 | (2006.01) |
| G01P 15/08 | (2006.01) |
| G01P 15/097 | (2006.01) |
| G01C 19/5776 | (2012.01) |

(52) U.S. Cl.
CPC ............ *G01P 3/14* (2013.01); *G01C 19/5776* (2013.01); *G01P 15/08* (2013.01); *G01P 15/097* (2013.01)

(58) Field of Classification Search
CPC ........ G01P 3/14; G01P 15/08; G01C 19/5776
USPC ...................................................... 73/514.15
See application file for complete search history.

(56) References Cited

U.S. PATENT DOCUMENTS

| | | | | |
|---|---|---|---|---|
| 5,610,525 | A * | 3/1997 | Yoshida | G01R 19/16542 324/427 |
| 6,351,116 | B1 * | 2/2002 | Bolda | G01R 35/005 324/202 |
| 6,396,354 | B1 * | 5/2002 | Murayama | H03D 1/2281 331/17 |
| 6,617,756 | B1 | 9/2003 | Uchiyama | |
| 7,768,357 | B2 | 8/2010 | Yamakawa | |
| 7,808,151 | B2 | 10/2010 | Komine | |
| 2003/0214278 | A1 | 11/2003 | Yoshihara | |
| 2008/0092675 | A1 * | 4/2008 | Komine | G01C 19/5607 74/5.4 |
| 2009/0217757 | A1 | 9/2009 | Nozawa | |
| 2009/0224601 | A1 * | 9/2009 | Ito | G01R 31/2879 307/31 |
| 2011/0192226 | A1 * | 8/2011 | Hayner | G01C 19/5776 73/504.12 |

(Continued)

FOREIGN PATENT DOCUMENTS

| | | |
|---|---|---|
| CN | 1461011 A | 12/2003 |
| CN | 101520327 A | 9/2009 |

(Continued)

*Primary Examiner* — Lisa Caputo
*Assistant Examiner* — Tarun Sinha
(74) *Attorney, Agent, or Firm* — Harness, Dickey & Pierce, P.L.C.

(57) ABSTRACT

A physical quantity sensor includes: a sensor element which detects predetermined physical quantity; a driving circuit which generates a driving signal of the sensor element; and an AGC circuit which controls the driving signal at a constant level according to a reference voltage, based on an output signal of the sensor element, in which the reference voltage is variable.

9 Claims, 7 Drawing Sheets

(56) References Cited

U.S. PATENT DOCUMENTS

| | | | |
|---|---|---|---|
| 2012/0050087 A1* | 3/2012 | Aoki | H03G 3/30 341/158 |
| 2012/0147631 A1* | 6/2012 | Nate | H02M 3/33507 363/21.15 |
| 2012/0319735 A1* | 12/2012 | Nagda | G01R 31/31703 327/73 |

FOREIGN PATENT DOCUMENTS

| JP | 2001-007648 A | 1/2001 |
|---|---|---|
| JP | 2004-120293 A | 4/2004 |
| JP | 2004-120523 A | 4/2004 |
| JP | 2004-328505 A | 11/2004 |
| JP | 2007-116563 A | 5/2007 |
| JP | 2008-107324 A | 5/2008 |
| JP | 2009-164691 A | 7/2009 |

\* cited by examiner

PHYSICAL QUANTITY SENSOR, ELECTRONIC DEVICE, AND MOVING OBJECT

BACKGROUND

1. Technical Field

The present invention relates to a physical quantity sensor, an electronic device, and a moving object.

2. Related Art

Currently, for various systems or electronic devices, physical quantity sensors capable of detecting various physical quantity items, such as an acceleration sensor for detecting acceleration or a gyro sensor for detecting angular velocity, have been widely used. In recent years, since the various physical quantity sensors are mounted on a vehicle, extremely high reliability has been required.

For example, a gyro sensor using a piezoelectric vibrator may have a slight crystal defect of a sensor element or a slight damage such as a microcrack occurring in a manufacturing step, and the sensor element may be damaged over time due to the defect or the damaged portion. It is difficult to detect all defects in inspection of electrical properties before shipping, and accordingly it is normal to have a burn-in test for the gyro sensor for a vehicle market in which high reliability is required, in order to detect the damage to the element, in addition to the general test for the electrical properties. In the defect detection of such an element, a method called overdriving for increasing a drive level of the piezoelectric vibrator to a higher level than a level normally used, is generally used.

JP-A-2001-07648 discloses a configuration of a piezoelectric oscillator which includes a constant voltage circuit between a power supply and an oscillating circuit, and is configured so as to supply a constant voltage to the oscillating circuit, in which the constant voltage circuit can be set to be invalid. According to this piezoelectric oscillator, since the constant voltage circuit can be set to be invalid, it is possible to change a drive level by changing a power supply voltage.

JP-A-2004-120523 discloses a crystal oscillator capable of performing quality determination from a frequency change amount due to change in capacity of an external load capacitor, by attaching an external load capacitor with a variable capacity value to an oscillating circuit. According to this crystal oscillator, it is not necessary to provide an additional circuit for setting a function of the constant voltage circuit to be invalid.

JP-A-2004-328505 discloses a piezoelectric oscillator capable of separating a piezoelectric vibrator and an oscillating circuit by providing a switch circuit between the piezoelectric vibrator and the oscillating circuit. According to this piezoelectric oscillator, when performing an overdriving process used for removal of foreign body, the piezoelectric vibrator and the oscillating circuit can be separated from each other and accordingly, it is possible to prevent damage to the oscillating circuit due to high voltage application.

However, since the physical quantity sensor such as the gyro sensor may have an auto gain control (AGC) circuit which is embedded therein for maintaining constant output sensitivity, and the overdriving process is difficult to perform even when a higher power supply voltage than usual is applied, the drive level of the sensor element does not change even when the method disclosed in JP-A-2001-07648 or JP-A-2004-120523 is applied as it is. Accordingly, since the time required for the burn-in test is long, it is difficult to reduce test cost and it is also difficult to evaluate drive level properties. In addition, in the method disclosed in JP-A-2004-328505, since it is necessary to apply an AC voltage having large amplitude from the outside, the application to a tuning fork type vibrator using bending vibration may be merely a breakdown test.

SUMMARY

An advantage of some aspects of the invention is to provide a physical quantity sensor capable of reducing time in a burn-in test by enabling overdriving of a sensor element, and an electronic device and a moving object using the physical quantity sensor.

The invention can be implemented as the following forms or application examples.

Application Example 1

A physical quantity sensor according to this application example includes: a sensor element which detects predetermined physical quantity; a driving circuit which generates a driving signal of the sensor element; and an AGC circuit which controls the driving signal at a constant level according to a reference voltage, based on an output signal of the sensor element, in which the reference voltage is variable.

The physical quantity sensor according to this application example may be an inertial sensor such as an acceleration sensor, a gyro sensor (angular velocity sensor), or a velocity sensor, or may be a clinometer which measures an inclined angle based on gravity.

According to the physical quantity sensor according to this application example, since the reference voltage of the AGC circuit is variable, it is possible to set the reference voltage of the AGC circuit to a high voltage when performing a burn-in test. Accordingly, it is possible to overdrive the sensor element to be operated in a high load state, and therefore it is possible to reduce the time of the burn-in test.

Application Example 2

The physical quantity sensor according to the application example described above may further include: a reference voltage circuit which generates a first voltage signal; and a selection circuit which selects and outputs one voltage signal from a plurality of voltage signals including the first voltage signal, based on a control signal, and the output signal of the selection circuit may be the reference voltage.

According to the physical quantity sensor according to this application example, by changing the voltage signal selected by the selection circuit, it is possible to easily change the reference voltage of the AGC circuit.

Application Example 3

In the physical quantity sensor according to the application example described above, the selection circuit may select and output either the first voltage signal or a second voltage signal input from an external terminal, based on the control signal.

According to the physical quantity sensor according to this application example, when performing the burn-in test, by making the selection circuit select the second voltage signal, it is possible to apply high voltage to the reference voltage of the AGC circuit through the external terminal. Accordingly, it is possible to overdrive the sensor element to be operated in a high load state, and therefore it is possible to reduce the time of the burn-in test.

According to the physical quantity sensor according to this application example, since the reference voltage of the AGC circuit can be arbitrarily set from the external terminal, it is possible to apply optimal overdriving voltages based on the properties of the sensor elements to perform the burn-in test. Accordingly, since the optimal burn-in test can be performed with respect to the plurality of types of sensors having different properties from each other, it is possible to realize a physical quantity sensor having high reliability at low cost.

According to the physical quantity sensor according to this application example, by applying the voltage from the outside to the reference voltage of the AGC circuit through the external terminal while variably setting the voltage, it is also possible to perform drive level dependence (DLD) inspection of the sensor element.

Application Example 4

In the physical quantity sensor according to the application example described above, the reference voltage circuit may further generate a second voltage signal which is greater than the first voltage signal, and the selection circuit may select and output either the first voltage signal or the second voltage signal based on the control signal.

According to the physical quantity sensor according to this application example, when performing the burn-in test, by making the selection circuit in order to select the second voltage signal, it is possible to apply high voltage to the reference voltage of the AGC circuit. Accordingly, it is possible to overdrive the sensor element to be operated in a high load state, and therefore it is possible to reduce the time of the burn-in test.

In the physical quantity sensor according to this application example, it is possible to overdrive the sensor element without applying voltage from the outside. Accordingly, it is possible to prevent damage to the sensor element due to problem of an inspector originating from an error of set voltage or short between terminals.

Application Example 5

In the physical quantity sensor according to the application example described above, the selection circuit may select and output the first voltage signal in a first mode, and may select and output either the first voltage signal or the second voltage signal in a second mode.

According to the physical quantity sensor according to this application example, in the first mode, by applying the first voltage signal to the reference voltage of the AGC circuit, it is possible to maintain a drive level of the sensor element at an optimal constant value. In contrast, in the second mode, since the second voltage signal can be applied to the reference voltage of the AGC circuit, it is possible to overdrive the sensor element to be operated in a high load state, and realize time reduction in the burn-in test.

Application Example 6

In the physical quantity sensor according to the application example described above, the reference voltage circuit may further generate second to n-th (n is an integer equal to or greater than 3) voltage signals, at least a part of which is greater than the first voltage signal, and the selection circuit may select and output any of the first to n-th voltage signal.

According to the physical quantity sensor according to this application example, by setting at least a part of the second to n-th voltage signals to be greater than the first voltage signal, and selecting a greater voltage signal than the first voltage signal from the second to n-th voltage signals by the selection circuit when performing the burn-in test, it is possible to apply a high voltage to the reference voltage of the AGC circuit. Accordingly, it is possible to overdrive the sensor element to be operated in a high load state, and therefore it is possible to reduce the time of the burn-in test.

According to the physical quantity sensor according to this application example, by making the second to n-th voltage signals respectively accord with n-1 types of voltages to be applied to the reference voltage of the AGC circuit for performing each optimal burn-in test with respect to n-1 types of sensor elements having different properties from each other, it is possible to apply optimal overdriving voltages based on the properties of the sensor elements to perform the burn-in test. Accordingly, since the optimal burn-in test can be performed with respect to the plurality of types of sensors having different properties from each other, it is possible to realize a physical quantity sensor having high reliability at low cost.

According to the physical quantity sensor according to this application example, by sequentially applying the first to n-th voltage signals to the reference voltage of the AGC circuit, it is possible to realize DLD inspection of the sensor element.

According to the physical quantity sensor according to this application example, it is possible to overdrive the sensor element without applying voltage from the outside. Accordingly, it is possible to prevent damage to the sensor element due to problem of an inspector originated to an error of set voltage or short between terminals.

Application Example 7

In the physical quantity sensor according to this application example described above, the selection circuit may select and output the first voltage signal in a first mode, and may select and output any of the first to n-th voltage signal in a second mode.

According to the physical quantity sensor according to this application example, in the first mode, by applying the first voltage signal to the reference voltage of the AGC circuit, it is possible to maintain a drive level of the sensor element at an optimal constant value. On the other hand, in the second mode, since the voltage signal which is greater than the first voltage signal can be applied to the reference voltage of the AGC circuit, it is possible to overdrive the sensor element to be operated in a high load state, and realize time reduction in the burn-in test. Alternatively, in the second mode, since the first to n-th voltage signals can be applied to the reference voltage of the AGC circuit, it is possible to realize DLD inspection of the sensor element.

Application Example 8

The physical quantity sensor according to the application example described above may further include a switch circuit for outputting the driving signal to the outside.

According to the physical quantity sensor according to this application example, it is possible to easily realize DLD inspection of the sensor element while monitoring the driving signal from the outside.

Application Example 9

An electronic device according to this application example includes any of the physical quantity sensors described above.

Application Example 10

A moving object according to this application example includes any of the physical quantity sensors described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
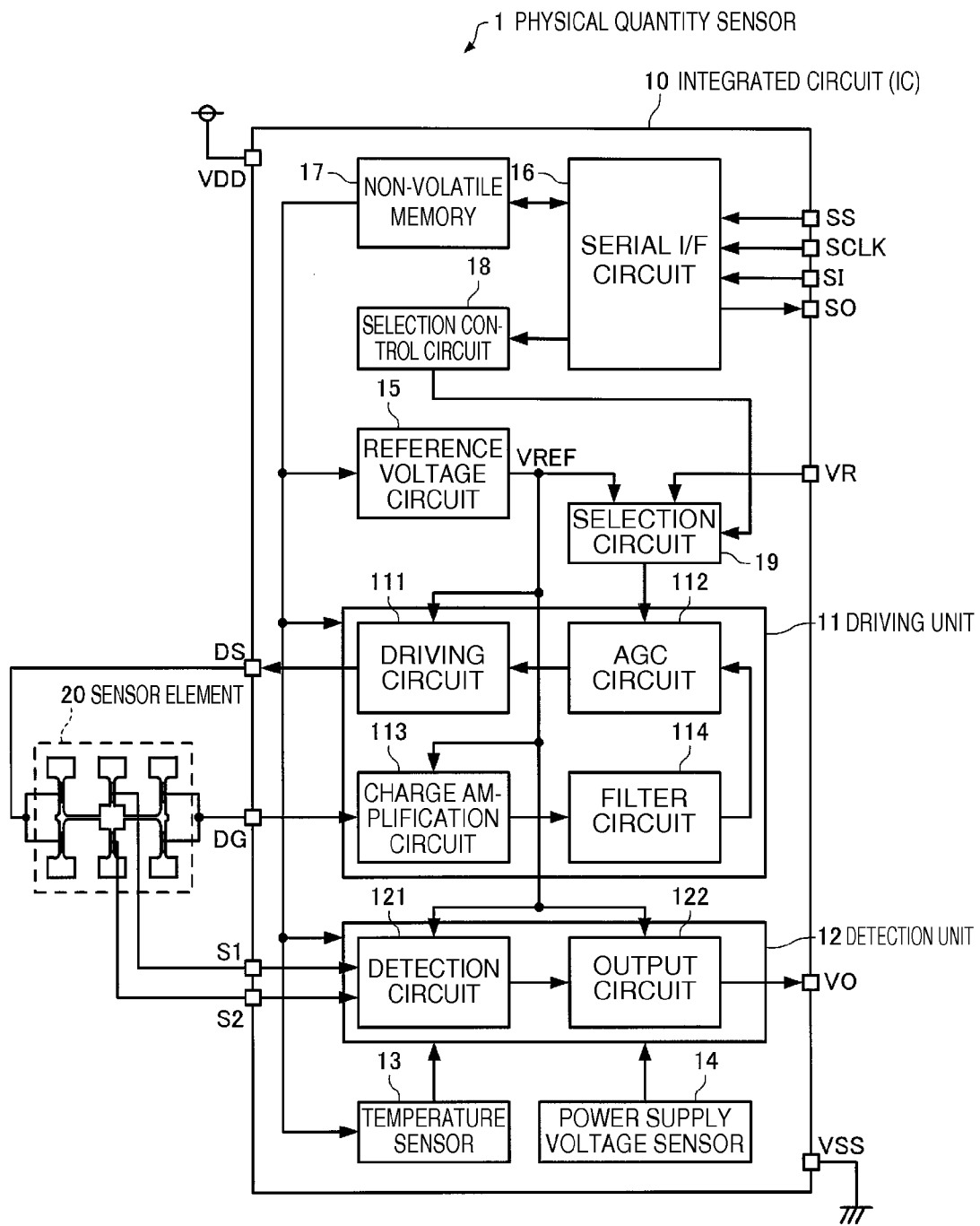
FIG. 1 is a diagram showing a configuration example of a physical quantity sensor of a first embodiment.

Hereinafter, preferred embodiments of the invention will be described in detail with reference to the drawings. The embodiments which will be described hereinafter do not unduly limit the content of the invention according to the appended claims. All configurations which will be described hereinafter are not limited to be compulsory constituent elements of the invention.
1. Physical Quantity Sensor
1-1. First Embodiment FIG. 1 is an example of a function block diagram of a physical quantity sensor of a first embodiment. As shown in FIG. 1, a physical quantity sensor 1 of the first embodiment includes an integrated circuit (IC) 10 and a sensor element 20.

In FIG. 1, the sensor element 20 is a vibrating type piezoelectric angular velocity detection element, in which two driving electrodes and two detection electrodes are formed on a so-called double T-type crystal vibrating piece including two T-type driving vibrating arms and one detection vibrating arm disposed therebetween.

If an AC voltage signal is applied as a driving signal, the two driving vibrating arms of the sensor element 20 performs bending vibration (excitation vibration) in which tip ends repeatedly approach or separate from each other by an inverse piezoelectric effect. When amplitudes of the bending vibration of the two driving vibrating arms are equivalent to each other, the two driving vibrating arms perform the bending vibration by constantly maintaining a line-symmetrical relationship with respect to the detection vibrating arm, and accordingly the detection vibrating arm does not generate vibration.

In this state, when angular velocity with an axis perpendicular to an excitation vibration surface of the sensor element 20 as a rotating axis is applied, the two driving vibrating arms obtain Coriolis force in a direction perpendicular to both the direction of the bending vibration and the rotating axis. As a result, a symmetric property of the bending vibration of the two driving vibrating arms is lost, and the detection vibrating arm performs bending vibration so as to be balanced. Phases of the bending vibration of the detection vibrating arms and the bending vibration (excitation vibration) of the driving vibrating arms associated with the Coriolis force, are deviated by 90°. AC charge of opposite phases (phases differ by 180°) based on the bending vibration by a piezoelectric effect, is generated in the two detection electrodes. The AC charge changes depending on magnitude of the Coriolis force (that is, magnitude of angular velocity applied to the sensor element 20).

The vibrating piece of the sensor element 20 may be a double T type, may be a tuning fork type or a comb type, or may be a tuning bar type having a shape of a triangular prism, a quadrangular prism, or a cylinder. As a material of the vibrating piece of the sensor element 20, instead of crystal ($SiO_2$), a piezoelectric material such as piezoelectric single crystal such as lithium tantalite ($LiTaO_3$), lithium niobate ($LiNbO_3$) or piezoelectric ceramics such as zirconate titanate (PZT) may be used or a silicon semiconductor may be used. For example, a structure in which a piezoelectric thin film interposed between the driving electrodes such as zinc oxide (ZnO) or aluminum nitride (AlN) is disposed on a part of a surface of a silicon semiconductor, may be used.

The sensor element 20 is not limited to a piezoelectric sensor element, and may be a vibrating sensor element which is an electrodynamic type, a capacitance type, an eddy current type, an optical type, or a strain gauge type. Alternatively, a system of the sensor element 20 is not limited to the vibrating system, and may be an optical, rotating, or fluid system, for example. The physical quantity to be detected by the sensor element 20 is not limited to the angular velocity, and may be angular acceleration, acceleration, velocity, or a force.

As shown in FIG. 1, in the embodiment, the two driving electrodes of the sensor element 20 are connected to a DS terminal and DG terminal, respectively, of the integrated circuit (IC) 10. The two detection electrodes of the sensor element 20 are connected to an S1 terminal and an S2 terminal, respectively, of the integrated circuit (IC) 10.

The integrated circuit (IC) 10 is configured to include a driving unit 11, a detection unit 12, a temperature sensor 13, a power supply voltage sensor 14, a reference voltage circuit 15, a serial interface circuit 16, a non-volatile memory 17, a selection control circuit 18, and a selection circuit 19. The integrated circuit (IC) 10 may have a configuration obtained by omitting or changing a part of the elements shown in FIG. 1 or by adding other elements thereto.

The reference voltage circuit 15 generates a constant voltage or a constant current such as a reference voltage VREF (analog ground voltage) from a power supply voltage supplied from a VDD terminal, and supplies the reference voltage VREF to the driving unit 11, the detection unit 12, the temperature sensor 13, and the selection circuit 19.

The serial interface circuit 16 receives each of a selection signal, a clock signal, a serial input signal from an SS terminal, an SCLK terminal, and an SI terminal. The serial interface circuit 16 samples the serial input signal by the clock signal when the selection signal is enabled, and performs an analysis process of a command included in the serial input signal or a process of converting serial data included in the serial input signal into parallel data. In addition, the serial interface circuit 16 performs writing (setting) or reading out of data with respect to the non-volatile memory 17 or an internal register (not shown) based on the command. The serial interface circuit 16 performs a process of converting the data read out from the non-volatile memory 17 or the internal register into serial data and outputting the serial data to the outside through an SO terminal.

The non-volatile memory 17 holds various adjustment data items or correction data items with respect to the driving unit 11, the detection unit 12, and the temperature sensor 13. The non-volatile memory 17 can be realized by a metal oxide nitride oxide silicon (MONOS) type memory, for example.

The driving unit 11 is configured to include a driving circuit 111, an AGC circuit 112, a charge amplification circuit 113, and a filter circuit 114.

The driving circuit 111 generates an AC driving signal for the excitation vibration of the sensor element 20, and supplies the driving signal to one of the driving electrodes of the sensor element 20 through the DS terminal. Driving current flowing to the vibrating piece of the sensor element 20 by the driving signal, is input into the charge amplification circuit 113 through the DG terminal.

The charge amplification circuit 113 converts output current of the sensor element 20 into an AC voltage signal and amplifies and outputs this AC voltage signal. The output signal of the charge amplification circuit 113 is input to the AGC circuit 112 through the filter circuit 114.

The AGC circuit 112 controls the driving signal to be at a constant level (constant amplitude) based on the reference voltage, so that the driving current to flow to the sensor element is constant, based on a level of the output signal of the filter circuit 114. By the AGC circuit 112, the drive level of the sensor element 20 can be constantly maintained regardless of disturbance of the power supply voltage fluctuation or temperature fluctuation. Accordingly, it is possible to constantly maintain element sensitivity of the sensor element 20 and to prevent a decrease in detection precision of the physical quantity sensor 1.

The detection unit 12 is configured to include a detection circuit 121 and an output circuit 122.

The detection circuit 121 receives each AC charge (detection current) generated in the two detection electrodes of the sensor element 20 through the S1 terminal and the S2 terminal, detects only an angular velocity component included in the AC charge (detection current), and generates a signal (angular velocity signal) at a voltage level according to the magnitude of the angular velocity.

The output circuit 122 buffers and outputs the angular velocity signal generated by the detection circuit 121 to the outside through a VO terminal. The output circuit 122 may perform. A/D conversion of the angular velocity signal and output digital data (digital data showing angular velocity) subjected to the A/D conversion to the outside through the serial interface circuit 16. Alternatively, after converting the detection current input through the S1 and S2 terminals into a voltage and further performing the A/D conversion, the detection unit 12 may generate the detection signal (angular velocity signal) by a digital process and output the detection signal to the outside through the serial interface circuit 16.

The detection unit 12 performs zero-point power supply voltage correction, zero-point temperature correction, and sensitivity temperature correction of the angular velocity signal, using the output signal of the temperature sensor 13, the output signal of the power supply voltage sensor 14, and the correction data stored in the non-volatile memory 17.

Particularly, in the embodiment, the AGC circuit 112 adjusts amplitude of the driving signal using the voltage output by the selection circuit 19 as a reference voltage. Accordingly, as the reference voltage becomes great, the amplitude of the driving signal becomes great.

The selection circuit 19 selects and outputs any of the reference voltage VREF (one example of a first voltage signal) generated by the reference voltage circuit 15 and a voltage (one example of a second voltage signal) input from the outside through a VR terminal, based on a control signal output by the selection control circuit 18.

The selection control circuit 18 outputs a control signal for controlling switching of selection signals by the selection circuit 19, based on a set value written in a predetermined internal register from the serial interface circuit 16. For example, the selection control circuit 18 may generate a control signal of the selection circuit 19 so that the selection circuit 19 selects the reference voltage VREF in a normal operation mode (one example of a first mode) and selects either the reference voltage VREF or the voltage input from the outside through the VR terminal based on the set value of the internal register in a test mode (one example of a second mode).

The control signal of the selection circuit 19 may be input from the outside through a predetermined external terminal. In this case, the selection control circuit 18 is not necessary.

According to the physical quantity sensor of the first embodiment described above, in the normal operation mode, by constantly applying the reference voltage VREF to the reference voltage of the AGC circuit 112, it is possible to maintain the drive level of the sensor element 20 at an optimal constant value. On the other hand, in the test mode, since a higher voltage than the reference voltage VREF can be applied to the reference voltage of the AGC circuit 112 through the VR terminal, it is possible to overdrive the sensor element 20 to be operated in a high load state. Accordingly, it is possible to realize time reduction in a burn-in test and to reduce inspection cost.

According to the physical quantity sensor of the first embodiment, since the reference voltage of the AGC circuit 112 can be arbitrarily set from the VR terminal, it is possible to apply an optimal overdriving voltage based on the properties of the sensor element 20 to perform the burn-in test. Accordingly, since it is not necessary to change design of the integrated circuit (IC) 10 for performing each optimal burn-in test with respect to the plurality of sensor elements 20 having different properties, it is possible to realize a physical quantity sensor having high reliability at low cost.

1-2. Second Embodiment

Figure 2:
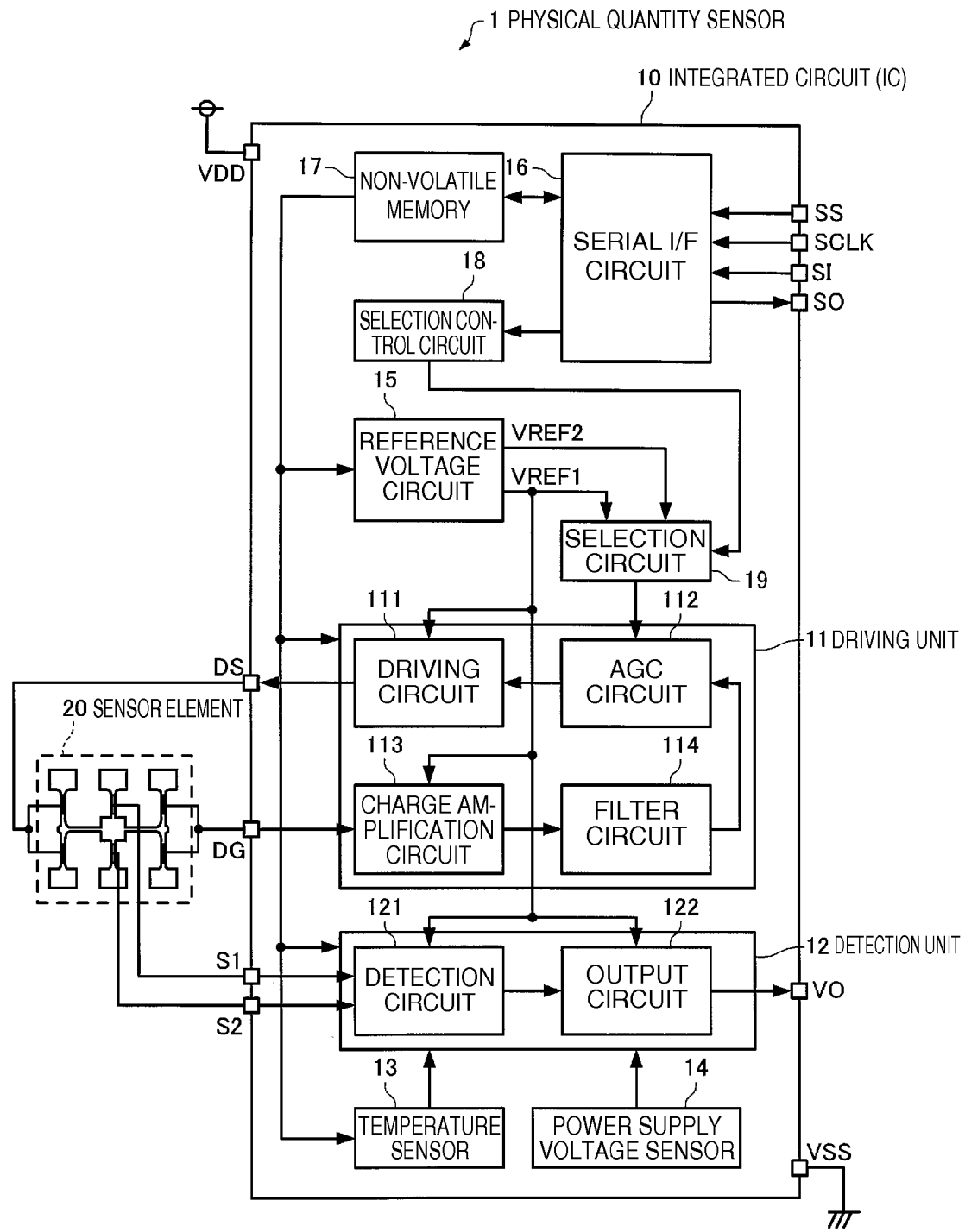
FIG. 2 is a diagram showing a configuration example of a physical quantity sensor of a second embodiment.

FIG. 2 is an example of a function block diagram of a physical quantity sensor of a second embodiment. In FIG. 2, the same reference numerals are denoted for the same constituent elements as in the first embodiment (FIG. 1). As shown in FIG. 2, in the physical quantity sensor 1 of the second embodiment, the configurations of the constituent elements are the same as those of the first embodiment (FIG. 1), but the configurations of the reference voltage circuit 15 and the selection control circuit 18 are different from those of the first embodiment (FIG. 1).

In the physical quantity sensor 1 of the second embodiment, the reference voltage circuit 15 generates a reference voltage VREF1 (one example of a first voltage signal) and a reference voltage VREF2 (an example of a second voltage signal) which is higher than the reference voltage VREF1. The reference voltage VREF1 is the same voltage as the reference voltage VREF of the first embodiment (FIG. 1), and is supplied to the driving unit 11, the detection unit 12, the temperature sensor 13, and the selection circuit 19, in the same manner as in the first embodiment (FIG. 1).

The selection circuit 19 selects and outputs either the reference voltage VREF1 or the reference voltage VREF2, based on the control signal output by the selection control circuit 18. For example, the selection control circuit 18 may generate a control signal of the selection circuit 19 so that the selection circuit 19 selects the reference voltage VREF1 in a normal operation mode (one example of a first mode) and selects either the reference voltage VREF1 or the reference voltage VREF2 based on the set value of the internal register in a test mode (one example of a second mode).

The control signal of the selection circuit 19 may be input from the outside through a predetermined external terminal. In this case, the selection control circuit 18 is not necessary.

The other configurations of the physical quantity sensor 1 of the second embodiment are the same as those of the first embodiment (FIG. 1) and therefore the description thereof will be omitted.

According to the physical quantity sensor of the second embodiment described above, in the normal operation mode, by constantly applying the reference voltage VREF1 to the reference voltage of the AGC circuit 112, it is possible to maintain the drive level of the sensor element 20 at an optimal constant value. On the other hand, in the test mode, since the reference voltage VREF2 which is higher than the reference voltage VREF1 can be applied to the reference voltage of the AGC circuit 112, it is possible to overdrive the sensor element 20 to be operated in a high load state. Accordingly, it is possible to realize time reduction in a burn-in test and to reduce inspection cost.

In the physical quantity sensor of the second embodiment, since the reference voltage VREF2 generated by the reference voltage circuit 15 is input to the selection circuit 19, instead of the voltage input from the outside through the VR terminal shown in FIG. 1, it is possible to overdrive the sensor element 20 without applying the voltage from the outside. Accordingly, it is possible to prevent damage to the sensor element 20 due to problem of an inspector originated to an error of the set voltage or short between terminals.

1-3. Third Embodiment

Figure 3:
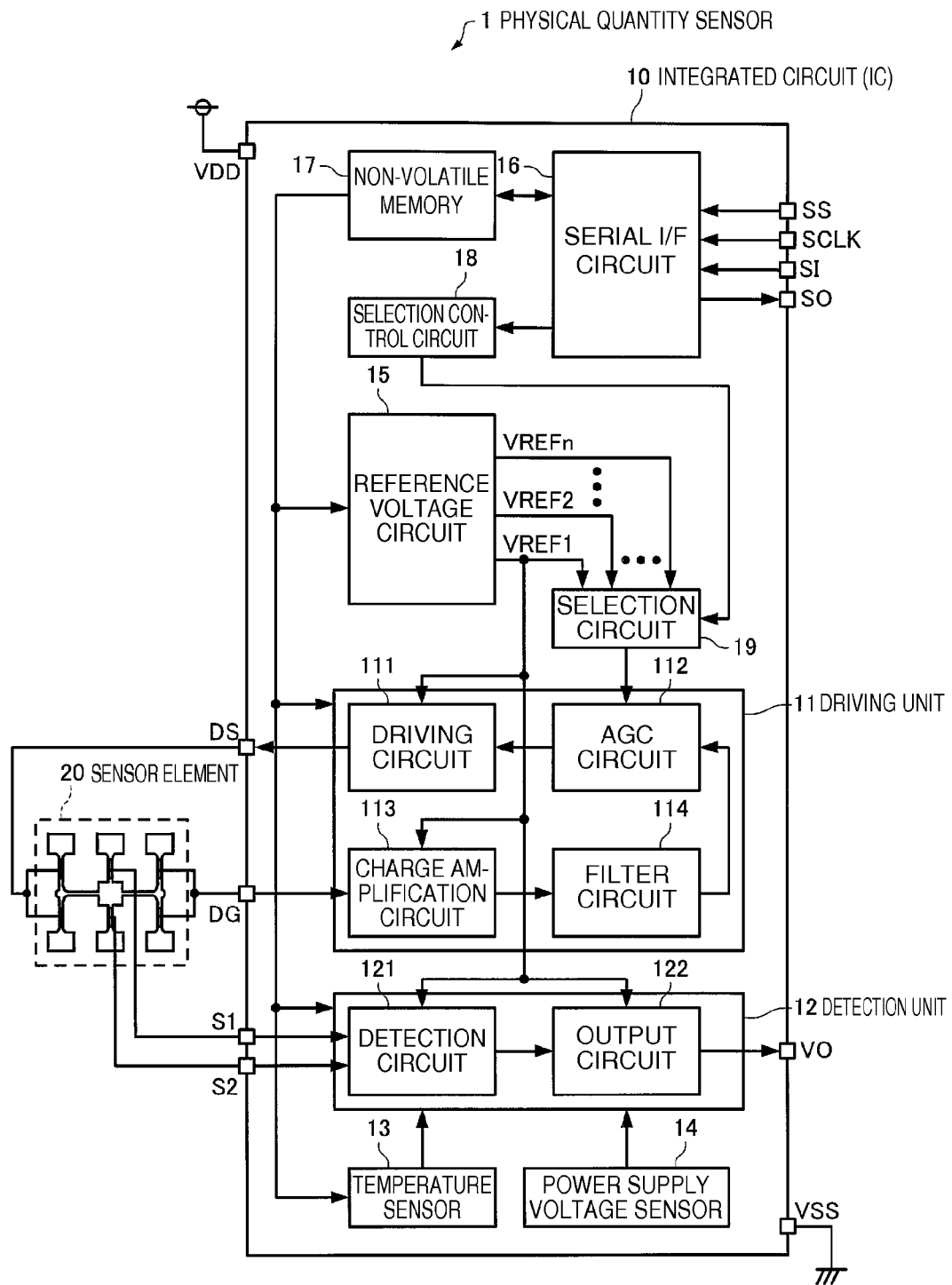
FIG. 3 is a diagram showing a configuration example of a physical quantity sensor of a third embodiment.

FIG. 3 is an example of a function block diagram of a physical quantity sensor of a third embodiment. In FIG. 3, the same reference numerals are denoted for the same constituent elements as in the first embodiment (FIG. 1). As shown in FIG. 3, in the physical quantity sensor 1 of the third embodiment, the configurations of the constituent elements are the same as those of the first embodiment (FIG. 1), but the configurations of the reference voltage circuit 15, the selection control circuit 18, and the selection circuit 19 are different from those of the first embodiment (FIG. 1).

In the physical quantity sensor 1 of the third embodiment, the reference voltage circuit 15 generates n (n≥3) types of reference voltage VREF1 to VREFn (an example of first to n-th voltage signal). The reference voltage VREF1 is the same voltage as the reference voltage VREF of the first embodiment (FIG. 1), and is supplied to the driving unit 11, the detection unit 12, the temperature sensor 13, and the selection circuit 19, in the same manner as in the first embodiment (FIG. 1). The reference voltages VREF2 to VREFn are different from each other, and all of them are voltages higher than the reference voltage VREF1.

The selection control circuit 18 outputs a control signal having a plurality of bits for controlling switching of selection signals by the selection circuit 19, based on a set value written in a predetermined internal register from the serial interface circuit 16. The selection circuit 19 selects and outputs any of the reference voltages VREF1 to VREFn, based on the control signal output by the selection control circuit 18. For example, the selection control circuit 18 may generate a control signal of the selection circuit 19 so that the selection circuit 19 selects the reference voltage VREF1 in a normal operation mode (one example of a first mode) and selects any of the references voltages VREF1 to VREFn based on the set value of the internal register in a test mode (one example of a second mode).

The control signal of the selection circuit 19 may be input from the outside through the predetermined numbers of external terminals capable of selecting each of the references voltages VREF1 to VREFn. In this case, the selection control circuit 18 is not necessary.

The other configurations of the physical quantity sensor 1 of the third embodiment are the same as those of the first embodiment (FIG. 1) and therefore the description thereof will be omitted.

According to the physical quantity sensor of the third embodiment described above, in the normal operation mode, by constantly applying the reference voltage VREF1 to the reference voltage of the AGC circuit 112, it is possible to maintain the drive level of the sensor element 20 at an optimal constant value. On the other hand, in the test mode, since any of the reference voltages VREF2 to VREFn which is higher than the reference voltage VREF1 can be applied to the reference voltage of the AGC circuit 112, it is possible to overdrive the sensor element 20 to be operated in a high load state. Accordingly, it is possible to realize time reduction in a burn-in test and to reduce inspection cost.

According to the physical quantity sensor of the third embodiment, by making the reference voltages VREF2 to VREFn respectively accord with n-1 types of voltages to be applied to the reference voltage of the AGC circuit 112 for performing each optimal burn-in test with respect to n-1 types of sensor elements 20 having different properties from each other, it is possible to apply optimal overdriving voltages based on the properties of the sensor elements 20 to perform the burn-in test. Accordingly, since it is not necessary to change design of the integrated circuit (IC) 10 for performing each optimal burn-in test with respect to the plurality of sensor elements 20 having different properties in order to perform each optimal burn-in test, it is possible to realize a physical quantity sensor having high reliability at low cost.

In addition, in the physical quantity sensor of the third embodiment, since the reference voltages VREF2 to VREFn generated by the reference voltage circuit 15 are input to the selection circuit 19, instead of the voltage input from the outside through the VR terminal shown in FIG. 1, it is possible to overdrive the sensor element 20 without applying the voltage from the outside. Accordingly, it is possible to prevent damage to the sensor element 20 due to problem of an inspector originated to an error of set voltage or short between terminals.

1-4. Fourth Embodiment

Figure 4:
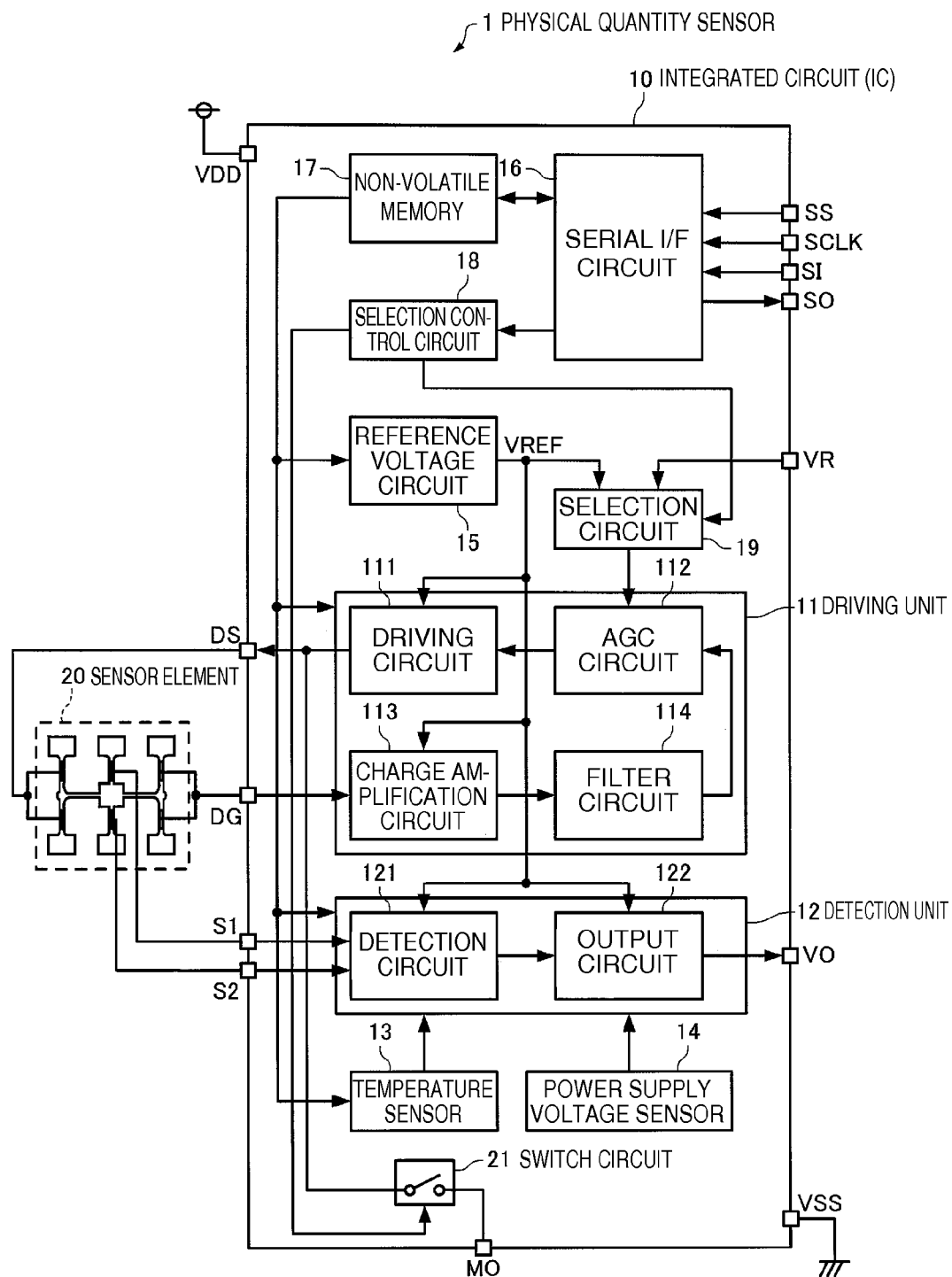
FIG. 4 is a diagram showing a configuration example of a physical quantity sensor of a fourth embodiment.

FIG. 4 is an example of a function block diagram of a physical quantity sensor of a fourth embodiment. In FIG. 4, the same reference numerals are denoted for the same constituent elements as in the first embodiment (FIG. 1). As shown in FIG. 4, in the physical quantity sensor 1 of the fourth embodiment, a switch circuit 21 is added and the configuration of the selection control circuit 18 is different with respect to the first embodiment (FIG. 1).

In the physical quantity sensor 1 of the fourth embodiment, the selection control circuit 18 outputs a first control signal for controlling switching of selection signals by the selection circuit 19, based on a set value written in a predetermined internal register from the serial interface circuit 16. In addition, the selection control circuit 18 outputs a second control signal for controlling switching on and off of the switch circuit 21 based on a set value written in a predetermined internal register from the serial interface circuit 16.

The selection circuit 19 selects and outputs any of the reference voltage VREF (one example of a first voltage signal) generated by the reference voltage circuit 15 and the voltage (one example of a second voltage signal) input from the outside through a VR terminal, based on the first control signal output by the selection control circuit 18. For example, the selection control circuit 18 may generate the first control signal so that the selection circuit 19 selects the reference voltage VREF in a normal operation mode (one example of a first mode) and selects either the reference voltage VREF or the voltage input from the outside through the VR terminal based on the set value of the internal register in a test mode (one example of a second mode).

The switch circuit 21 is switched on or off based on the second control signal output by the selection control circuit 18. When the switch circuit 21 is switched on, the driving signal output by the driving circuit 111 can be monitored from the outside through an MO terminal. On the other hand, when the switch circuit 21 is switched off, the output of the driving circuit 111 is disconnected from the MO terminal, and the physical quantity sensor 1 of the fourth embodiment has the same configuration as that of the first embodiment (FIG. 1). For example, the selection control circuit 18 may generate the second control signal so that the switch circuit 21 is constantly switched off in the normal operation mode and is switched on or off based on the set value of the internal register in the test mode.

The first control signal and the second control signal may be changed in association with each other. For example, the selection control circuit 18 may generate the first control signal and the second control signal so that the switch circuit 21 is switched off when the selection circuit 19 selects the reference voltage VREF, and the switch circuit 21 is switched on when the selection circuit 19 selects the voltage input from the outside through the VR terminal.

The first control signal may be input from the outside through a predetermined external terminal. In addition, the second control signal may be input from the outside through a predetermined external terminal. In a case where both of the first control signal and the second control signal are input from the different external terminals, the selection control circuit 18 is not necessary.

The other configurations of the physical quantity sensor 1 of the fourth embodiment are the same as those of the first embodiment (FIG. 1) and therefore the description thereof will be omitted.

The physical quantity sensor of the fourth embodiment described above obtains the same effects as those the physical quantity sensor of the first embodiment.

According to the physical quantity sensor of the fourth embodiment, by applying the voltage from the outside to the reference voltage of the AGC circuit 112 through the VR terminal while variably setting the voltage, in a state where the driving signal can be monitored through the MO terminal, it is possible to change the driving voltage of the sensor element 20 and to measure a relationship between the driving voltage and the driving current, a relationship between the driving voltage and an oscillation frequency, and the like. Accordingly, it is possible to realize DLD inspection of the sensor element 20. That is, according to the physical quantity sensor of the fourth embodiment, it is possible to perform both the burn-in test and the DLD inspection of the sensor element 20, and to realize a physical quantity sensor having high reliability at low cost.

1-5. Fifth Embodiment

Figure 5:
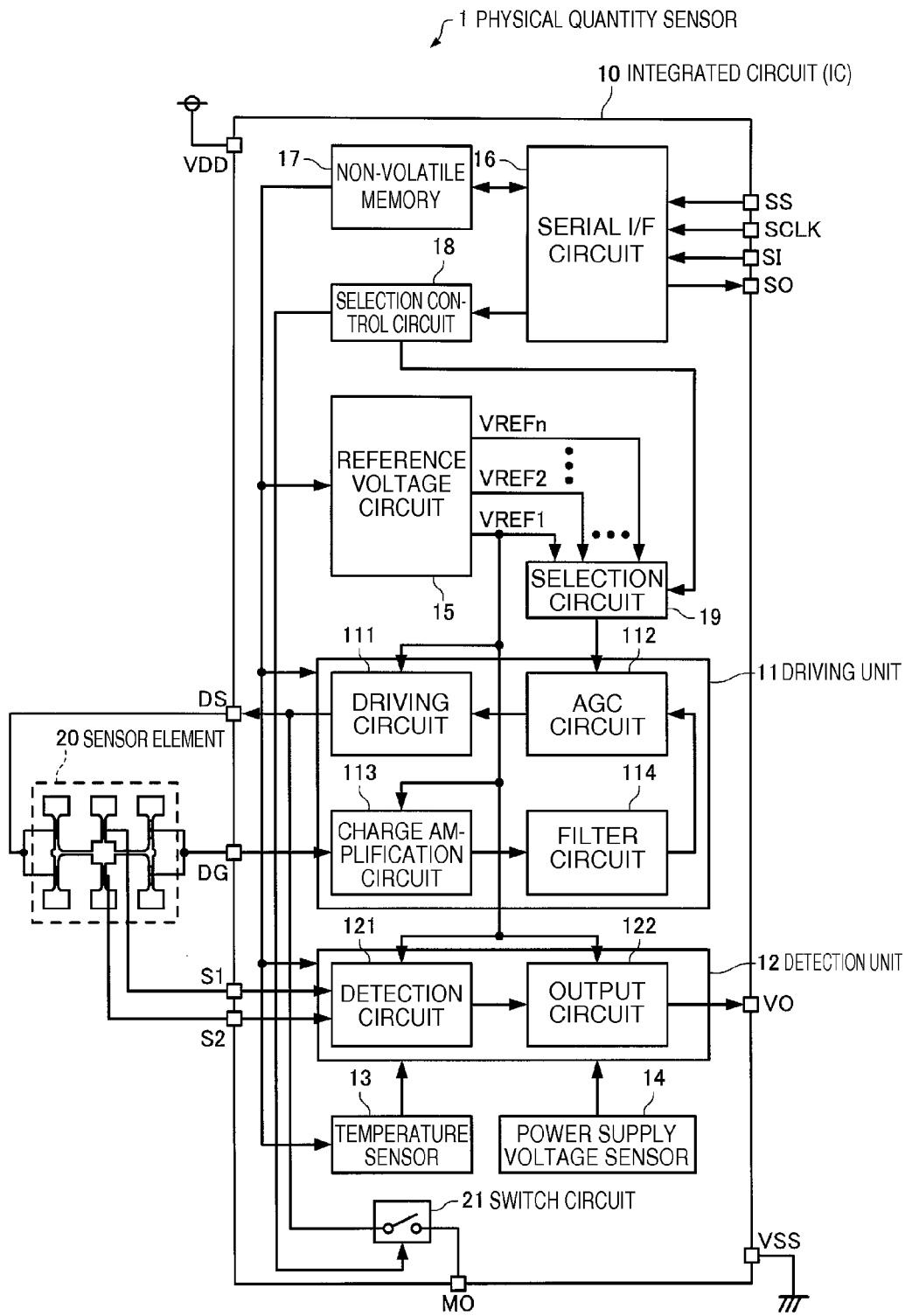
FIG. 5 is a diagram showing a configuration example of a physical quantity sensor of a fifth embodiment.

FIG. 5 is an example of a function block diagram of a physical quantity sensor of a fifth embodiment. In FIG. 5, the same reference numerals are denoted for the same constituent elements as in the third embodiment (FIG. 3). As shown in FIG. 5, in the physical quantity sensor 1 of the fifth embodiment, the switch circuit 21 is added and the configurations of the reference voltage circuit 15 and the selection control circuit 18 are different with respect to the third embodiment (FIG. 3).

In the physical quantity sensor 1 of the fifth embodiment, the reference voltage circuit 15 generates n (n≥3) types of reference voltage VREF1 to VREFn (an example of first to n-th voltage signal). The reference voltage VREF1 is the same voltage as the reference voltage VREF of the first embodiment (FIG. 1), and is supplied to the driving unit 11, the detection unit 12, the temperature sensor 13, and the selection circuit 19, in the same manner as the first embodiment (FIG. 1). The reference voltages VREF2 to VREFn are different from each other, in which the reference voltages VREF2 to VREFk (k<n) are lower than the reference voltage VREF1 and reference voltages VREF(k+1) to VREFn are higher than the reference voltage VREF1.

The selection control circuit 18 outputs a first control signal having a plurality of bits for controlling switching of selection signals by the selection circuit 19, based on a set value written in a predetermined internal register from the serial interface circuit 16. In addition, the selection control circuit 18 outputs a second control signal for controlling switching on and off of the switch circuit 21 based on a set value written in a predetermined internal register from the serial interface circuit 16.

The selection circuit 19 selects and outputs any of the reference voltages VREF1 to VREFn, based on the first control signal output by the selection control circuit 18. For example, the selection control circuit 18 may generate the first control signal so that the selection circuit 19 selects the reference voltage VREF1 in a normal operation mode (one example of a first mode) and selects any of the references voltages VREF1 to VREFn based on the set value of the internal register in a test mode (one example of a second mode).

The switch circuit 21 is switched on or off based on the second control signal output by the selection control circuit 18. When the switch circuit 21 is switched on, the driving signal output by the driving circuit 111 can be monitored from the outside through the MO terminal. On the other hand, when the switch circuit 21 is switched off, the output of the driving circuit 111 is disconnected from the MO terminal, and the physical quantity sensor 1 of the fifth embodiment has the same configuration as that of the third embodiment (FIG. 3). For example, the selection control circuit 18 may generate the second control signal so that the switch circuit 21 is constantly switched off in the normal operation mode and is switched on or off based on the set value of the internal register in the test mode.

The first control signal and the second control signal may be changed in association with each other. For example, the selection control circuit 18 may generate the first control signal and the second control signal so that the switch circuit 21 is switched off when the selection circuit 19 selects the reference voltage VREF1 in the normal operation mode, and selection circuit 19 selects the reference voltages VREF1 to VREFn and the switch circuit 21 is switched on based on the set value of the internal register in the test mode.

The first control signal may be input from the outside through a predetermined external terminal. In addition, the second control signal may be input from the outside through a predetermined external terminal. In a case where both the first control signal and the second control signal are input from the different external terminals, the selection control circuit 18 is not necessary.

The other configurations of the physical quantity sensor 1 of the fifth embodiment are the same as those of the third embodiment (FIG. 3) and therefore the description thereof will be omitted.

According to the physical quantity sensor of the fifth embodiment described above, in the normal operation mode, by constantly applying the reference voltage VREF1 to the reference voltage of the AGC circuit 112, it is possible to maintain the drive level of the sensor element 20 at an optimal constant value. On the other hand, in the test mode, since any of the reference voltages VREF (k+1) to VREFn which is higher than the reference voltage VREF1 can be applied to the reference voltage of the AGC circuit 112, it is possible to overdrive the sensor element 20 to be operated in a high load state. Accordingly, it is possible to realize time reduction in a burn-in test and to reduce inspection cost.

According to the physical quantity sensor of the fifth embodiment described above, by making the reference voltages VREF (k+1) to VREFn respectively accord with n-k types of voltages to be applied to the reference voltage of the AGC circuit 112 for performing each optimal burn-in test with respect to n-k types of sensor elements 20 having different properties from each other, it is possible to apply optimal overdriving voltages based on the properties of the sensor elements 20 to perform the burn-in test. Accordingly, since it is not necessary to change design of the integrated circuit (IC) 10 for performing each optimal burn-in test with respect to the plurality of sensor elements 20 having different properties in order to perform each optimal burn-in test, it is possible to realize a physical quantity sensor having high reliability at low cost.

In addition, according to the physical quantity sensor of the fifth embodiment, by sequentially applying the voltages VREF1 to VREFn to the reference voltage of the AGC circuit 112, in a state where the driving signal can be monitored through the MO terminal, it is possible to change the driving voltage of the sensor element 20 and to measure the relationship between the driving voltage and the driving current, the relationship between the driving voltage and an oscillation frequency, and the like. Accordingly, it is possible to realize DLD inspection of the sensor element 20. That is, according to the physical quantity sensor of the fifth embodiment, it is possible to perform both of burn-in test and the DLD inspection of the sensor element 20, and to realize a physical quantity sensor having high reliability at low cost.

Further, in the physical quantity sensor of the fifth embodiment, since the reference voltages VREF2 to VREFn generated by the reference voltage circuit 15 are input to the selection circuit 19, instead of the voltage input from the outside through the VR terminal shown in FIG. 4, it is possible to drive the sensor element 20 with different voltages, without applying the voltage from the outside. Accordingly, it is possible to prevent damage to the sensor element 20 due to problem of an inspector originated to an error of the set voltage or short between terminals.

2. Electronic Device

Figure 6:
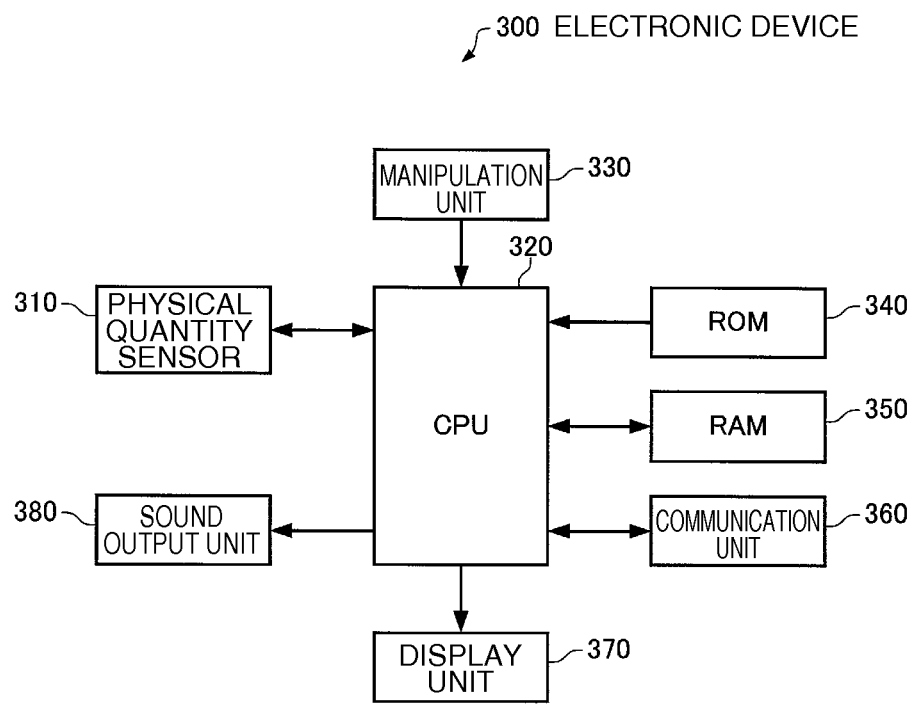
FIG. 6 is a block diagram showing a function of an electronic device of the embodiment.
Figure 7:
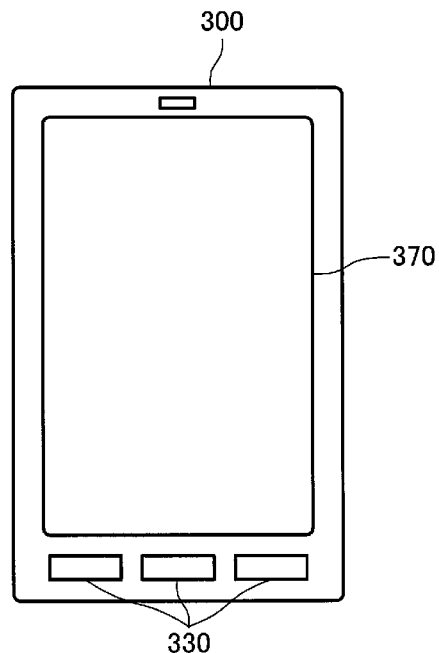
FIG. 7 is a diagram showing an example of the appearance of an electronic device of the embodiment.

FIG. 6 is a function block diagram of an electronic device of the embodiment. FIG. 7 is a diagram showing an example of the appearance of a smart phone which is an example of an electronic device of the embodiment.

An electronic device 300 of the embodiment is configured to include a physical quantity sensor 310, a central processing unit (CPU) 320, a manipulation unit 330, a read-only memory (ROM) 340, a random access memory (RAM) 350, a communication unit 360, a display unit 370, and a sound output unit 380. The electronic device of the embodiment may have a configuration obtained by omitting or changing a part of the constituent elements shown in FIG. 6 or by adding other constituent elements thereto.

The physical quantity sensor 310 is a device which detects physical quantity and outputs a signal (physical quantity signal) at a level based on the detected physical quantity, and may be an inertial sensor which detects at least apart of physical quantity, for example, acceleration, angular velocity, or velocity, and may be a clinometer which measures an inclined angle. As the physical quantity sensor 310, the physical quantity sensor 1 of each embodiment described above can be applied, for example.

The CPU 320 performs various computing processes or control processes using a physical quantity signal output by the physical quantity sensor 310, according to a program stored in the ROM 340 or the like. In addition, the CPU 320 performs various processes based on a manipulation signal from the manipulation unit 330, a process of controlling the communication unit 360 for performing data communication with the outside, a process of transmitting a display signal for displaying various information items to the display unit 370, and a process of outputting various sound items to the sound output unit 380.

The manipulation unit 330 is an input device configured with a manipulation keys or button switches, and outputs the manipulation signal based on the manipulation of the CPU 320 by a user.

The ROM 340 stores a program or data for the CPU 320 to perform various computing processes or control processes.

The RAM 350 is used as a work area of the CPU 320, and temporarily stores a program or data read out from the ROM 340, data input from the manipulation unit 330, and a result of operation executed by the CPU 320 based on various programs.

The communication unit 360 performs various control processes for realizing data communication between the CPU 320 and an external device.

The display unit 370 is a display device configured with a liquid crystal display (LCD) or an organic EL display, and displays various information items based on the display signal input from the CPU 320. A touch panel for functioning as the manipulation unit 330 may be provided on the display unit 370.

The sound output unit 380 is a device which outputs sound, such as a speaker.

By introducing the physical quantity sensor 1 of each embodiment described above as the physical quantity sensor 310, it is possible to realize an electronic device having higher reliability.

Various electronic devices are considered as the electronic device 300, for example, a personal computer (for example, a mobile-type personal computer, laptop-type personal computer, a notebook-type personal computer, or a tablet-type personal computer), a moving object terminal such as a mobile phone, a digital still camera, an ink jet type discharging apparatus (for example, ink jet printer), a storage area network apparatus such as a router or a switch, a local area network apparatus, a television, a video camera, a video camera recorder, a car navigation apparatus, a pager, an electronic organizer (including communication function), an electronic dictionary, a calculator, an electronic game device, a game controller, a word processor, a work station, a video phone, a security monitor, electronic binoculars, a POS terminal, medical equipment (for example, an electronic thermometer, a blood pressure meter, a blood glucose meter, an ECG measuring device, an ultrasound diagnostic device, an electronic endoscope), a fishfinder, a variety of measurement equipment, a meter (for example, meters for vehicles, aircraft, ships), a flight simulator, a head mounted display, motion tracing, motion tracking, a motion controller, PDR (pedestrian position and azimuth measurement), and the like.

3. Moving Object

Figure 8:
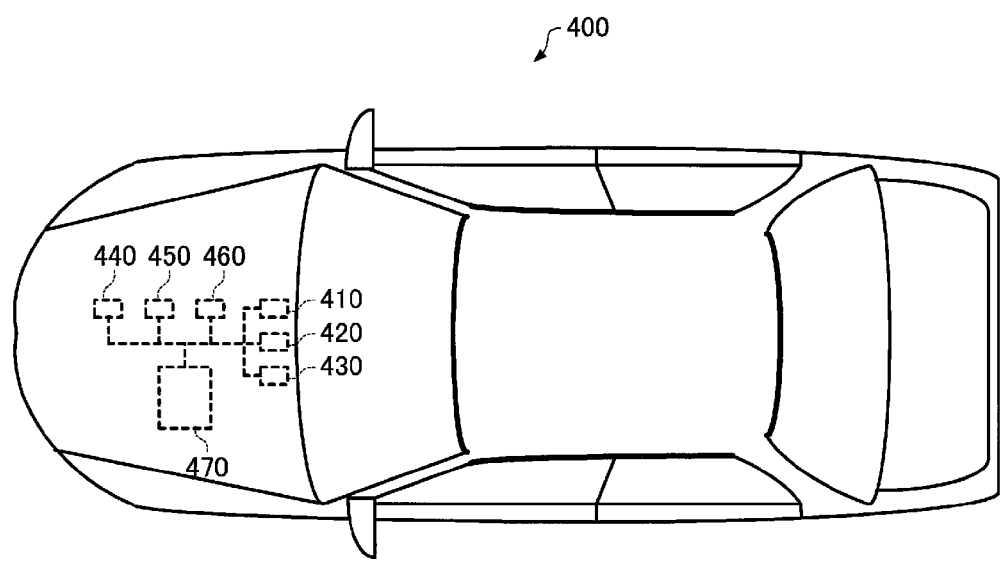
FIG. 8 is a diagram showing an example of a moving object of the embodiment.

FIG. 8 is a diagram (top view) showing an example of a moving object of the embodiment. A moving object 400 shown in FIG. 8 is configured to include physical quantity sensors 410, 420, and 430, controllers 440, 450, and 460, and a battery 470. The moving object of the embodiment may have a configuration obtained by omitting or changing a part of the constituent elements (units) shown in FIG. 8 or by adding other constituent elements thereto.

The physical quantity sensors 410, 420, and 430 and the controllers 440, 450, and 460 are operated by power supply voltage supplied from the battery 470.

The physical quantity sensors 410, 420, and 430 are devices which detect physical quantity and output a signal (physical quantity signal) at a level based on the detected physical quantity, and each thereof is an angular velocity sensor, an acceleration sensor, a velocity sensor, or a clinometers, for example.

The controllers 440, 450, and 460 perform various control processes of an attitude control system, a rollover protection system, or a braking system, using a part or all of the physical quantity signals output by the physical quantity sensors 410, 420, and 430.

The physical quantity sensor 1 of each embodiment described above can be applied as the physical quantity sensors 410, 420, and 430, and accordingly it is possible to ensure higher reliability.

Various moving objects are considered for the moving object 400, and a vehicle (including electric vehicle), an aircraft such as a jet or a helicopter, a ship, a rocket, or a satellite is used, for example.

The invention is not limited to the embodiments and various modifications can be performed within a range of a gist of the invention.

Each embodiment described above is one example and the invention is not limited thereto. For example, each embodiment can be appropriately combined with others.

The invention includes substantially the same configuration as the configuration described in the embodiments (for example, configuration having the same functions, methods, and results, or configuration having the same object and effects). The invention includes a configuration obtained by replacing the non-essential parts of the configuration described in the embodiments. The invention includes a configuration for realizing the same operation results or a configuration for reaching the same object as the configuration described in the embodiments. The invention includes a configuration obtained by adding the related art to the configuration described in the embodiments.

The entire disclosure of Japanese Patent Application No: 2013-068919, filed Mar. 28, 2013 is expressly incorporated by reference herein.

What is claimed is:

1. A physical quantity sensor comprising:
 a sensor element that detects a predetermined physical quantity;
 a driving circuit that generates a driving signal of the sensor element;
 a selection circuit that, based on a control signal, (i) in a first mode, selects and outputs a first voltage signal, as a reference voltage, from a plurality of voltage signals having different voltages based on a control signal and (ii) in a second mode, selects and outputs a second voltage, as the reference voltage, from the plurality of voltage signals, wherein the second voltage is greater than the first voltage; and
 an AGC circuit that receives the reference voltage from the selection circuit and controls the driving signal at a constant level according to the reference voltage, based on an output signal of the sensor element, wherein the second mode corresponds to a burn-in test mode in which the second voltage is selected to overdrive the sensor element.

2. The physical quantity sensor according to claim 1, further comprising:
 a reference voltage circuit which generates the first voltage signal.

3. The physical quantity sensor according to claim 2, wherein the selection circuit selects and outputs either the first voltage signal or the second voltage signal input from an external terminal, based on the control signal.

4. The physical quantity sensor according to claim 2, wherein the reference voltage circuit further generates the second voltage signal.

5. The physical quantity sensor according to claim 2, wherein the reference voltage circuit generates n (n is an integer equal to or greater than 3) of the second voltage signals, wherein at least one of the n second voltage signals is greater than the first voltage signal, and wherein the selection circuit selects and outputs any of the first voltage signal and the n second voltage signals.

6. The physical quantity sensor according to claim 1, further comprising:
 a terminal; and
 a switch circuit for selectively outputting the driving signal from the drive circuit to the terminal.

7. An electronic device comprising the physical quantity sensor according to claim 1.

8. A moving object comprising the physical quantity sensor according to claim 1.

9. A physical quantity sensor comprising:
 a sensor element that detects a predetermined physical quantity;
 a driving circuit that generates and outputs a driving signal for exciting the sensor element;
 a selection circuit that, based on a control signal, selects and outputs one voltage signal from a plurality of voltage signals having different voltages, wherein the output signal of the selection circuit is a reference voltage, wherein the selection circuit selects a first voltage signal, as the reference voltage, during a normal operation mode, and selects a second voltage signal, as the reference voltage, during a burn-in test mode, wherein the first voltage signal and the second voltage signal are among the plurality of voltage signals, and wherein the second voltage is greater than the first voltage; and an AGC circuit that receives the reference voltage from the selection circuit and controls the driving signal at a constant level according to the reference voltage and an output signal of the sensor element, wherein the second voltage is selected to overdrive the sensor element in the burn-in test mode.

* * * * *